United States Patent [19]

Moy

[11] Patent Number: 4,484,330
[45] Date of Patent: Nov. 20, 1984

[54] MAJORITY VOTE CIRCUIT

[75] Inventor: Gar Moy, Lake Hiawatha, N.J.

[73] Assignee: AT&T Bell Laboratories, Murray Hill, N.J.

[21] Appl. No.: 356,045

[22] Filed: Mar. 8, 1982

[51] Int. Cl.$^3$ .............................................. G06F 11/08
[52] U.S. Cl. ........................................ 371/36; 377/37
[58] Field of Search ............... 377/37, 39; 371/36, 371/6

[56] References Cited

U.S. PATENT DOCUMENTS

| | | | |
|---|---|---|---|
| 3,480,910 | 11/1969 | Brenza et al. | 371/6 |
| 4,132,975 | 1/1979 | Koike | 371/36 |
| 4,143,353 | 3/1979 | Schaible | 371/36 |
| 4,225,961 | 9/1980 | Raggenbass et al. | 371/36 |

Primary Examiner—Charles E. Atkinson
Attorney, Agent, or Firm—Joseph P. Kearns; John K. Mullarney

[57] ABSTRACT

A majority vote circuit determines when the majority of a group of signaling channels is properly conveying a common message in conjunction with a status signal individual to each channel. Respective status and message signals from each channel are scanned in pairs and in sequence. The number of valid message and status signals are accumulated in separate counters. A comparison circuit triggered by the completion of a scanning sequence matches counter outputs stage by stage to determine whether or not the count level in the message signal counter exceeds by one-half the count level in the status signal counter as an indication that a majority of a variable majority of the working channels conveys the same message signal.

3 Claims, 4 Drawing Figures

MAJORITY VOTE CIRCUIT

FIELD OF THE INVENTION

This invention relates to signal selection circuits, and more particularly, to so-called majority vote circuits.

BACKGROUND OF THE INVENTION

In a telephone switching system a central office, hereinafter referred to as the host office, controls the routing and interconnection of calls not only among directly terminating customer lines but also among such lines as terminate at remote switching modules linked to the host office by pluralities of trunks. This switching system employs time-shared digital switches under stored program control including a central processor at the host office and a module processor at each remote center. Communication between the host office and the several remote offices for message, control and timing information is carried out on digital carrier trunks. Typically as many as twenty digital trunks can be accommodated between the host office and each remote module. Flexibility is incorporated into the trunking arrangement by providing for time slot interchanges among the available trunks under the direction of the stored program. Furthermore, operational reliability is assured by providing duplex facilities, each of which includes its own module processor, at each remote module.

Since a remote switching module can be located as far as one hundred miles from its host office, provision is made for stand-alone operation. In this type of operation the remote module is capable of handling all local interconnections among lines which it terminates, even when the host office link goes out of service. As long as the host office link is down, however, some specialized services may become unavailable. When full service is restored or whenever software integrity, i.e., coordination between the central processor at the host office and module processors at a remote office, comes into question, it may be necessary to reestablish control by the host office. On such an occasion it becomes necessary to reset and resynchronize the module processor with the central processor. To avoid an inadvertent false reset of the module processors at a remote module it has been found to be desirable that the reset order be transmitted in parallel through all operating links simultaneously and that the validity of the reset message be verified for consistency among the operating trunks.

The subject matter of this invention is concerned with an efficient circuit for determining that a majority has been achieved, i.e., a majority vote circuit, from a plurality of common signaling paths.

It is an object of this invention to determine that a majority of a selected subset of input signals is in agreement at a receiving location.

It is a further object of this invention to provide a majority vote circuit by a serial rather than a combinatorial implementation.

SUJMMARY OF THE INVENTION

According to this invention, a common signal transmitted over a variable plurality of parallel paths to a remote location is monitored to determine whether or not the same signal is being received over a majority of the paths deemed to be operational by comparing the number of valid signals received with the number of paths in the signal receiving mode. The terminating circuits for each path are arranged to generate a pair of output signals. One of these signals is denominated a status signal to indicate that the receiver for the associated transmission path has been placed in a command mode. The other signal is the message itself, i.e., the command signal, to indicate, for example, that the remote location is to be reset to an initial condition. The command message, as transmitted over each channel, is a sequence of binary digits which needs to be converted by the receiver into a single pulse.

The majority vote circuit proper comprises first and second selectors for sampling the respective status and command signals from each connected channel, first and second counters for accumulating respective numbers of valid status and command signals sampled by the first and second selectors, a comparator for determining whether the respective counts standing in the first and second counters indicate that the number of valid command signals exceeds one-half the number of good status signals, and a clock for timing the selectors and for strobing the comparator at the end of the sampling sequence. An acceptable comparison at the end of a sampling sequence results in the output of a command pulse.

The selectors and the comparator can be implemented by an array of NAND gates and inverters in a single integrated circuit package.

Provision can be made for the instance in which only one channel exhibits a good status signal and only one command signal is accepted to generate a command pulse nevertheless.

BRIEF DESCRIPTION

This invention will be better understood from the following detailed description and the drawing in which.

DESCRIPTION OF AN ILLUSTRATIVE EMBODIMENT

Figure 1:
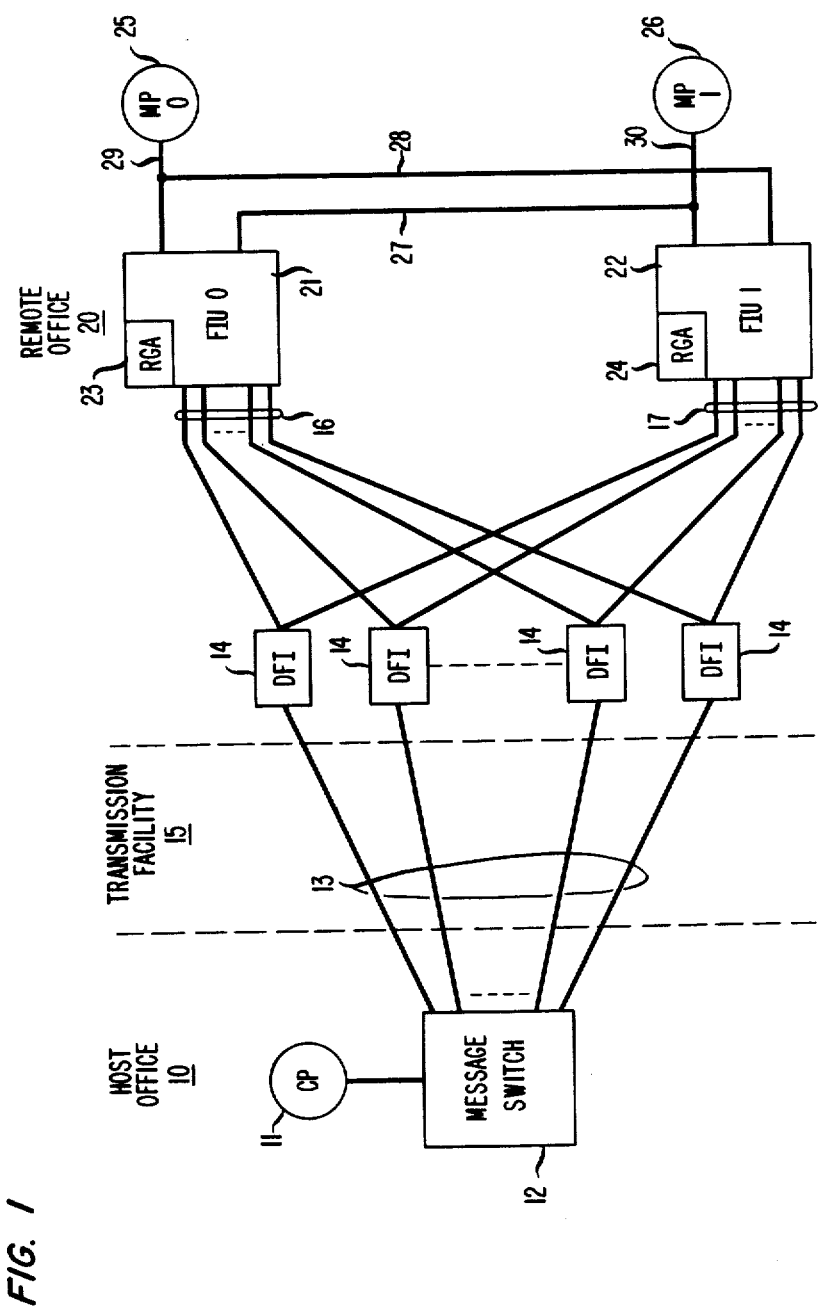
FIG. 1 is a block diagram of an electronic telephone switching system to which this invention is applicable.

FIG. 1 depicts in broad outline an electronic switching system for telephonic communication among a large number of telephone subscribers under stored program control. In particular, a centrally located host office 10 serves not only telephone subscribers (not shown) terminating thereat, but also those terminating at remote office 20 by way of transmission facility 15. Facility 15 advantageously uses digital techniques of the pulse-code modulation type.

Host office 10 comprises at least central processor 11 and message switch 12 for effecting both time and space division functions. Telephone subscriber lines are terminated on an interface module (not shown) and are connected through switch 12 under the control of central processor 11 to other subscriber lines terminated thereon, to subscribers terminated at other control offices, or to subscribers terminated at remote office 20.

Transmission facility 15 illustratively comprises a plurality of digital trunks 13. Each trunk 13 terminates in a digital facilities interface (DFI) unit 14. Message data, control data and timing information are carried over these trunks. In a representative installation there can be a minimum of four up to a maximum of twenty digital trunks and DFIs. Each DFI interfaces between digital trunks 13 and a set of data buses 16 and 17.

In addition to the DFI each remote office 20 comprises two facilities interface (FIU) units 21 and 22 and two module processors (MP) 25 and 26. FIUs 21 and 22 further connect to an interface module (not shown). The functions of the MP at the remote offices are coordinated with the CP at the host office through control messages transmitted over a selected pair of trunks 13. In addition, MP 25 and MP 26 render remote office 20 capable of stand-alone operation with respect to calling and called subscribers terminating at the interface module at remote office 20. FIU 21 and FIU 22, together with MP 25 and MP 26, are duplexed for reliability purposes. Each FIU acts as a back-up unit for the other.

Central Processor Intervention is a control feature built into the switching system of FIG. 1. CP 11 monitors the operation of the remote offices to detect malfunctions such as loss of timing synchronization or software integrity. Should the remote MP lose control, a message originating at the host office can be transmitted in dedicated time slots on all of trunks 13 to override the remote MP and bring it back into synchronism. To avoid an inadvertent override or reset of the remote MP the reset or command message is transmitted over all trunks and a majority vote circuit at each of FIU 21 and FIU 22 examines the plurality of command messages for consistency and outputs the final command only when a majority of the operational links provide the same message. Accordingly, each FIU is provided with a reset gate array (RGA) 23 or 24 to make the majority vote decision. Because of the majority vote provision the inadvertent reset of a remote office that is in stand alone condition is prevented.

In the illustrative embodiment the majority vote circuit is required to handle up to twenty pairs of status and command inputs. A known combinational approach in which each input pair of a group of twenty must be compared with every permutation of all the other pairs requires a tree having on the order of 168,000 gates.

Figure 2:
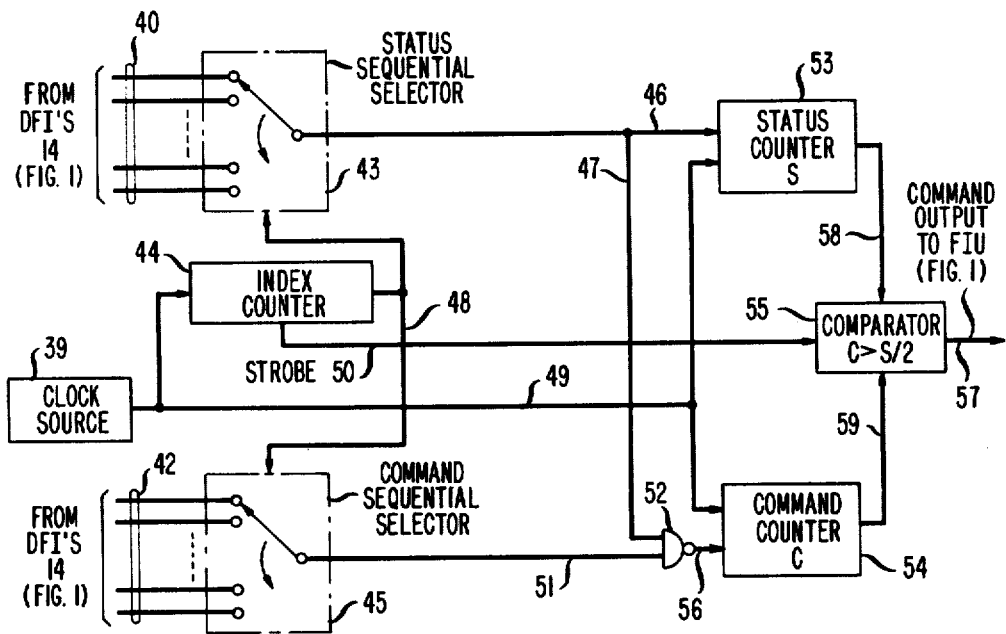
FIG. 2 is a block diagram of the majority vote circuit of this invention.

According to this invention, the majority vote circuit is implemented by counting the number of status and command signals sequentially and then comparing the counts at the end of the sequence. FIG. 2 depicts the majority vote circuit of this invention in simplified block schematic form. The majority vote circuit comprises clock source 39, sequential selectors 43 and 45, index counter 44, status counter 53, command counter 54 and comparator 55. Sequential selectors 43 and 45 sample respective status and command signals obtained from DFI 14 in FIG. 1. Each DFI generates a distinctive status signal to indicate that it is in the mode to receive a command, or in this instance, a reset message from host office 10. These status signals arrive at the RGAs in FIU 21 and FIU 22 over leads 40 and are sampled in sequence by selector 43. For each status signal received and decoded a pulse is delivered to status counter 53 over lead 46.

Each DFI further decodes the applicable command or reset signal itself. The command signals from all DFI arrive at the RGAs in FIU 21 and FIU 22 over leads 42 and are sampled in sequence by selector 45. For each command signal received and decoded a pulse is delivered to command counter 54 over leads 51 and 56 by way of NAND gate 52. NAND gate 52 protects against the application of spurious input signals to counter 54 by requiring an enabling input signal from status selector 43 over lead 47 before any signal on lead 51 can be registered.

Status counter 53 and command counter 54 are synchronized with clock source 39 over lead 49 as shown in FIG. 2. Selectors 43 and 45 are also synchronized with clock source 39 over lead 48 by way of index counter 44. Index counter 44 is driven by clock source 39 and is set to overflow and emit a strobe pulse on lead 50 at the maximum connectible number of DFIs.

Comparator 55 receives the count levels reached in status and command counters 53 and 54 over respective leads 58 and 59. When the strobe pulse from index counter 44 is applied over lead 50 to comparator 55, the respective count levels are compared to ascertain whether the number of command signals received exceeds half the number of status signals received in a given sequence, i.e., that a simple majority of the working trunks carried the command signal. Upon the determination that a majority has been realized a valid command or reset output signal appears on lead 57.

In accordance with the duplex reliability arrangement built into the switching system to which the majority vote circuit of this invention has been first applied, the RGAs is duplicated in each of FIU 21 and FIU 22 in FIG. 1 and the interconnections (not shown) are arranged such that agreement between both RGAs must occur before MP 25 and MP 26 receive any reset signal over leads 27, 28, 29 and 30.

Figure 3:
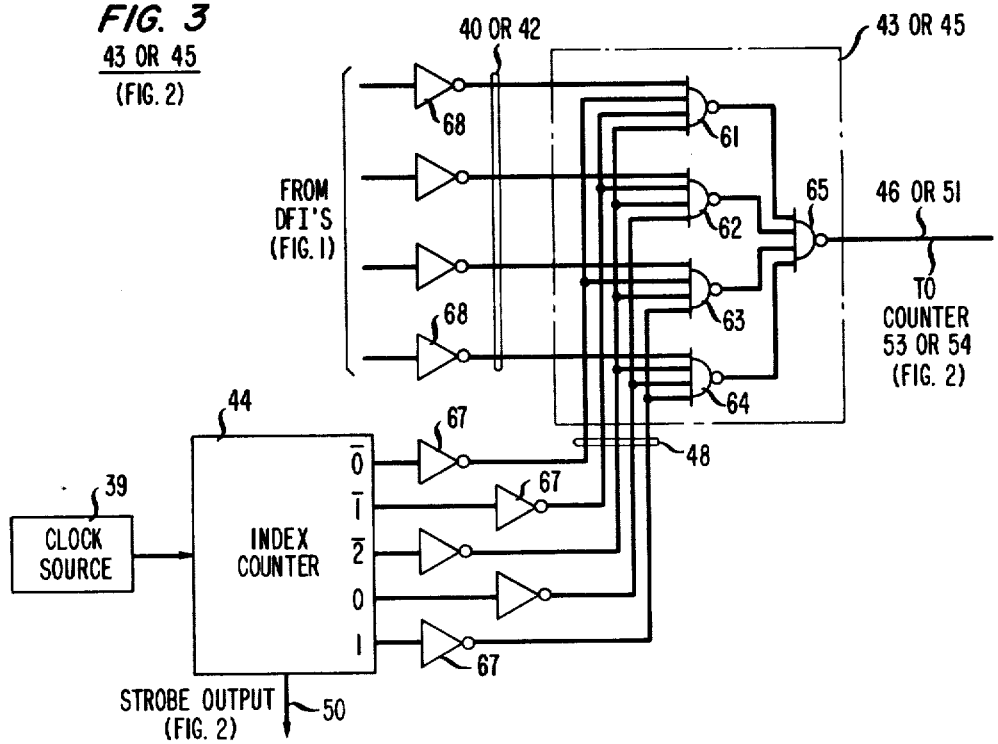
FIG. 3 is a block schematic diagram of a sequential selector circuit useful in the practice of this invention.

FIG. 3 is a more detailed block diagram of a selector circuit useful in implementing by integrated digital techniques selectors 43 and 45 in FIG. 2 for clarity. Clock source 39 and index counter 44 are repeated from FIG. 2. The logic devices within the broken-line box are useful in either of selectors 43 and 45. FIG. 3 is simplified with the assumption that there are only four trunks to be scanned by each selector. The principle set forth is extendible in a straightforward manner to larger numbers.

Due to the positive logic shown the outputs of counter 44 and the DFIs are fed through inverters 67 and 68, respectively. Bus 48 at the output of index counter 44 is developed into two sets of complementary outputs as shown. The counter is to be understood to employ a cascade of binary circuits each having a direct and complemented output. Their binary outputs in increasing positional significance are designated 0, 1, 2 and the overbar indicates the complemented output. As shown in FIG. 3, counting up to decimal four requires not more than three binary digits.

Within the broken-line box are shown four parallel NAND gates 61 through 65. NAND gates are a type of coincidence gate in which a specified low output results only when all inputs are high; and a high output otherwise. Four inputs from a DFI are found in cable 42 and these are connected through inverters 68 to inputs of gates 61 through 64 in sequence. The remaining inputs of gates 61 through 64 have applied to them count outputs from index counter 44 in numerical order. Thus, NAND gate 61 is enabled on the first count when the complemented 0, 1 and 2 outputs are low. NAND gate 62 is enabled similarly on the second count when the complemented 1 and 2 outputs are low and the direct 0 output is high. In like manner NAND gates 63 and 64 are successively enabled with the 1 output high as the complemented 2 and the direct 0 outputs shift from low to high. This scheme can be extended to any desired count level by combining the correct binary count outputs from index counter 44 to additional NAND gates. Whatever the counts, the successive status of the output of NAND gate 65 corresponds to the states of the signals from the respective DFIs. The positive outputs of NAND gate 65 advance the counts stored in either status counter 53 or command counter 54 of FIG. 2. Strobe output 50 of counter 44 is activated when a predetermined maximum count corresponding to the number of DFIs being scanned is reached.

Figure 4:
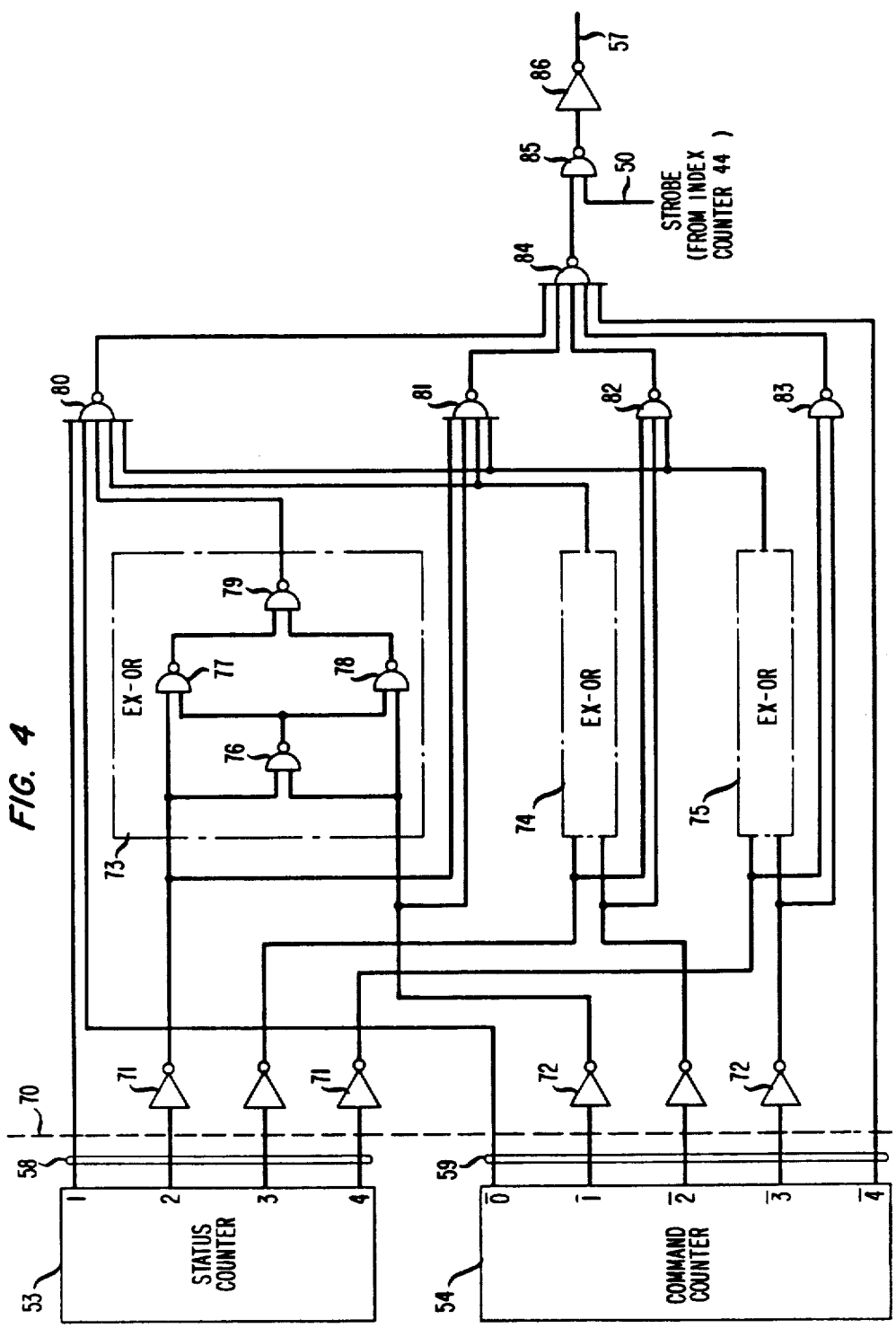
FIG. 4 is a block schematic diagram of a comparator useful in the practice of this invention.

FIG. 4 is a more detailed block diagram of a comparator circuit useful in implementing comparator 55 in FIG. 2 by integrated circuit digital techniques. The purpose of comparator 55 is to determine whether the number of valid command signals received exceeds half the number of working trunks, i.e., whether a majority of the trunks convey the same message. The comparison state is manifested by matching the counts standing in status counter 53 and command counter 54 at the end of a selection sequence.

In FIG. 4 counters 53 and 54 are repeated from FIG. 2 and their output buses 58 and 59 are developed to show individual conductors on which the output counts of required internal binary stages appear. Terminals numbered 0 through 4 indicate the states of interval counter stages in order of increasing binary-weighted positional significance, i.e., they correspond to the two's integer exponent of the position. The overbarred numbers are complementary outputs. All parts of FIG. 4 to the right of vertical broken line 70 are contained in block 55 of FIG. 2.

Exclusion circuits are used in FIG. 4 to distinguish like from unlike binary inputs. For example, exclusion circuits 73, 74 and 75 in FIG. 4 operate as correlators to yield a binary 0 output for like 00 or 11 inputs and a binary 1 output otherwise because each of its NAND gate elements 76 through 79 yields a binary 0 output if and only if both inputs are binary 1s. When both inputs to NAND gate 76, for example, are 1s, the output is 0. One input to each of gates 77 and 78 is consequently 0. Since the other inputs to gates 77 are at that time the same as the inputs to gate 76, their outputs are 1s. The latter outputs drive gate 79 to yield an overall output of 0. Similarly, when both inputs to NAND gate 76 are 0s, its output is 1 and this 1 is applied to both of gates 77 and 78. However, when the other inputs to gates 77 and 78 are 0s, each gate is receiving unlike inputs to produce 1 outputs as in the prior example and the output of gate 79 is again 0. Finally, when the inputs to gate 76 are unlike, its output is 1. But the inputs to gates 77 and 78 are opposites and consequently their outputs are opposites with the result that the output of gate 79 is 1. Exclusion circuits 73, 74 and 75, using NAND logic, can be called exclusive-OR (EX-OR) circuits.

The object of comparator 55 in FIG. 2 is to provide a 1 output when the command count is one larger than half the status count, and a 0 output otherwise. Expressed as an inequality, $S/2 < C$. The principle employed here avoids taking half of the status count by doubling the command count and comparing it with the actual status count. Thus, $S < 2C$. In binary arithmetic doubling is accomplished readily by a position shift. For example, binary five $-101-$ is doubled to ten by placing a zero on the right $-1010-$. The inequality $S < 2C$ can be tested by matching the digits of the C counter bit by bit in order of decreasing significance with the digits of the S counter displaced one position to the left. There is no need however, to perform any physical position shift in the C counter. It is only necessary to compare bit by bit the $(N+1)$st bit of the C count with the Nth bit of the S count. FIG. 4 is a block schematic diagram of a gate array for performing the majority vote comparison of block 55 in FIG. 2 in accordance with this principle.

The comparator of FIG. 4 comprises one or more EX-OR gates, such as 73, 74 and 75; a plurality of NAND gates such as 80, 81, 83 and 84; input circuits for gates 73, 74 and 75; and strobed output circuit 85.

The input circuit for the comparator of FIG. 4 includes the count outputs of respective status and command counters 53 and 54 such that each EX-OR gate compares a given status count with the next more significant command count. EX-OR circuit 73 thus compares the second position status count with the complemented first position command count. Due to the complementing of the command count a 1 output of EX-OR circuit 73 indicates equality between the compared bit positions. A 0 output denotes inequality between the compared bits and in this case it is necessary to determine whether the command count bit is larger, i.e., is a binary 1, than the status count. The latter comparison is made by applying the pair of input counts to NAND gate 80, as shown in FIG. 4. In order to preserve the positive logic employed inverters 71 are placed in series with the count outputs of counter 53 and inverters 72 are placed in series with the count outputs of counter 54.

EX-OR circuits 74 and 75 are similarly arranged to compare the third order output of counter 53 with the second order output of counter 54 and the fourth order output of counter 53 with the third order output of counter 54, respectively.

The four NAND gates 80 through 83 are connected as shown in FIG. 4 to the several outputs of EX-OR circuits 73 through 75 and to individual outputs of counters 53 and 54. Specifically, NAND gate 80 has as inputs the outputs from EX-OR gates 73, 74 and 75 and the first and zeroth order outputs of counters 53 and 54. The inputs from counters 53 and 54 implement the special case where only one trunk is in operation and that only the DFI associated with that trunk carries the command message.

Similarly, NAND gate 81 is driven by outputs of EX-OR gates 74 and 75 and the inputs to gate 73. NAND gate 82 is driven by the output of EX-OR gate 75 and the inputs to gate 74. NAND gate 83 is driven by the inputs to gate 75 only. The outputs of NAND gates 80 through 83 are combined in NAND gate 84. Any NAND gate exhibits a binary 1 output when an input is a binary 0. Thus NAND gate 84 provides a 1 as a command output when a 0 output is exhibited by any of gates 80 through 83. NAND gate 84 has a further direct input from the most significant position of command counter 54 as shown by the bottom lead in FIG. 4.

The operation of the comparator of FIG. 4 is readily understood by starting at the bottom. The most significant command count appearing on the bottom lead is applied directly to combining NAND gate 84 in complementary form. When this bit is 1, it is clear that the command count is higher than twice the status count because this bit has effectively undergone a left shift beyond the most significant status bit. The 0 complemented form applied to gate 84 completely determines the command 1 output. When the most significant bit is 0, however, it becomes necessary to compare the next most significant command bit with the most significant status bit. In order to match the logic of EX-OR circuit 75 and NAND gate 83, the direct status and complemented command bits after inversion in buffers 71 and 72 are employed. If and only if the command bit is 1 and the status bit is 0, the logic of NAND gate is such that the output is 0 and this comparison is decisive of the existence of the majority condition. On the other hand, EX-OR circuit 75 generates a 1 output when the compared bits are equal, and a 0 otherwise. The output of circuit 75 is applied to NAND gate 82 and to NAND gates 80 and 81 of lower orders, thereby enabling these gates for further comparisons when the compared bits of higher order are equal.

When the majority decision has not been concluded by the higher order comparison just described, the next bits of lower significance are compared in EX-OR circuit 74 and NAND gate 82. Again, if and only if the command bit is 1 and the status bit is 0, i.e., the command bit is larger than the status bit, a 0 output from NAND gate 82 completes the majority decision. Otherwise, EX-OR circuit 74 generates a 1 output which enables lower order NAND gates 80 and 81.

EX-OR circuit 73 and NAND gate 81 cooperate in the same manner for the pairing of the next lower order of command and status bits. When the command bit is larger than the status bit, the majority decision is made by generating a 0 at the output of NAND gate 81.

NAND gate 80 serves a special purpose to cover the condition where only one trunk circuit is operative and that only one validly decodes the command signal. Since all bit positions above the first order are 0 and equal when only one trunk is available, the lower three inputs to gate 80 are 1s. The remaining two inputs, as shown in FIG. 4, are the direct zero order command bit and the complemented first order status bit. When these are both 1s, their combination results in a 0 output from NAND gate 80 to indicate satisfaction of a defined majority vote statement.

The outputs of gates 80 through 83 are combined in NAND gate 84 which generates a 1 output as a command signal when any of its inputs is 0. Failure of all digit comparisons results in a 0 output from gate 84. The output of gate 84 is strobed through NAND gate 85 over lead 50 at the end of a selection sequence. The strobed output is finally reinverted to the 1 state on lead 57 in buffer 86.

The above illustrative embodiment reaches a majority vote decision for variable numbers of channels up to the capacity of the counters. Where the number of channels is fixed, only the command signals need be scanned and the fixed status states can be preprogrammed into status counter 53 as a fixed binary count representing the number of paths or channels over which a message can be sent in an obvious manner. The tiered gate array required in prior art majority vote circuits is eliminated and the hardware required to implement the majority vote circuit of this invention is reduced in size and complexity by several orders of magnitude over the prior art. The described embodiment has been implemented in a single integrated circuit pack employing fewer than 400 gates.

While this invention has been described in terms of a specific illustrative embodiment applied to a stored program telephone switching system, its principles can be extended and modified in a variety of ways by those skilled in the art within the spirit and scope of the appended claims.

What is claimed is:

1. A majority vote circuit comprising
   a sole message source,
   a receiver for interpreting command messages from said source,
   a plurality of channels for transmitting command messages from said source to said receiver,
   a status signal generator at the terminus of each of said channels,
   first and second scanners for selecting in sequence command and status signals, respectively from said channels,
   first and second counters for accumulating the numbers of respective command and status signals in a scanning sequence by said first and second scanners,
   a register for storing the number of channels being scanned by said first and second scanners, and
   a comparator jointly responsive to the output counts in said first and second counters when said register number is reached for generating a majority vote signal indicating that the count stored in said first counter exceeds half the count stored in said second counter.

2. The majority vote circuit set forth in claim 1 in which
   said first and second scanners comprise
   a plurality of coincidence gates having an input for each transmitting channel and a plurality of further inputs for sequential enablement,
   a clock source,
   a multistage index counter responsive to said clock source,
   means for connecting the several stages of said counter to the further inputs of said coincidence gates according to a binary counting sequence to control the sequential enablement thereof, and
   a buffer gate for combining the output signals from said coincidence gates into a serial pulse train.

3. The majority vote circuit set forth in claim 1 in which said comparator comprises
   first means for matching each digit from said first counter with the digit of next lower significance from said second counter to determine whether the complete number stored in said first counter is greater or lesser than half the number stored in said second counter,
   second means for matching each digit from said first counter with the digit of next lower significance from said second counter to determine whether the digits from said first and second counters are equal,
   a first coincidence gate for each pair of digits being compared jointly responsive to said first and second matching means for producing a significant output when the corrected first matching means indicates that the digit from the first counter is greater than that from the second counter and outputs from all higher order second matching means indicate that the compared digits are equal, and
   an output coincidence gate for combining the outputs of said first coincidence gate to generate a majority-vote command signal when the output of any first coincidence gate is significant.

* * * * *